(12) United States Patent
An

(10) Patent No.: US 7,325,784 B2
(45) Date of Patent: Feb. 5, 2008

(54) BALL VALVE

(76) Inventor: Byung moo An, #60, Bumnael-ri, Uljin-eup, Uljin-gun, Gyeongsangbuk-do, 767-801 (KR)

( * ) Notice: Subject to any disclaimer, the term of this patent is extended or adjusted under 35 U.S.C. 154(b) by 69 days.

(21) Appl. No.: 10/560,988

(22) PCT Filed: May 6, 2004

(86) PCT No.: PCT/KR2004/001053

§ 371 (c)(1),
(2), (4) Date: Dec. 14, 2005

(87) PCT Pub. No.: WO2005/001318

PCT Pub. Date: Jan. 6, 2005

(65) Prior Publication Data

US 2007/0138428 A1    Jun. 21, 2007

(30) Foreign Application Priority Data

Jun. 27, 2003   (KR) .................... 10-2003-0042340

(51) Int. Cl.
*F16K 5/06* (2006.01)
(52) U.S. Cl. .............................. 251/315.05; 251/315.13
(58) Field of Classification Search ........... 251/315.01, 251/315.05, 315.13
See application file for complete search history.

(56) References Cited

U.S. PATENT DOCUMENTS

| | | | | |
|---|---|---|---|---|
| 563,946 | A | * | 7/1896 | Wells ......................... 251/367 |
| 3,041,036 | A | * | 6/1962 | McFarland, Jr. ....... 251/315.11 |
| 3,336,939 | A | * | 8/1967 | Freed et al. ........... 251/315.05 |
| 3,647,179 | A | * | 3/1972 | Scaramucci et al. ... 251/315.13 |
| 4,265,427 | A | * | 5/1981 | Vinciguerra ........... 251/315.15 |
| 4,523,740 | A | * | 6/1985 | Paitchell ................ 251/315.05 |
| 4,696,323 | A | * | 9/1987 | Iff ......................... 251/315.13 |
| 5,067,691 | A | * | 11/1991 | Hunziker et al. ...... 251/315.05 |

\* cited by examiner

*Primary Examiner*—John Bastianelli
(74) *Attorney, Agent, or Firm*—Schmeiser, Olsen & Watts LLP

(57) ABSTRACT

A ball valve includes symmetric first and second valve casings (100) and (200) which respectively have first and second ball seats (120) and (220), first and second coupling flanges (130) and (230), first and second lever receiving parts (110) and (210), first and second ring-shaped grooves (132) and (232), a plurality of first and second coupling holes (131) and (231), and first and second stoppers (111) and (211). The ball valve further includes a ball (400) which is seated in both the first and second ball seats (120) and (220), a control lever (300) which is coupled to the ball (400) to control the ball, and a ring unit (500) which is seated in both the first and second ring-shaped grooves (132) and (232). The ball valve further includes a cap (600) which is fastened to both the first and second lever receiving parts (110) and (210).

4 Claims, 3 Drawing Sheets

[Fig. 1]
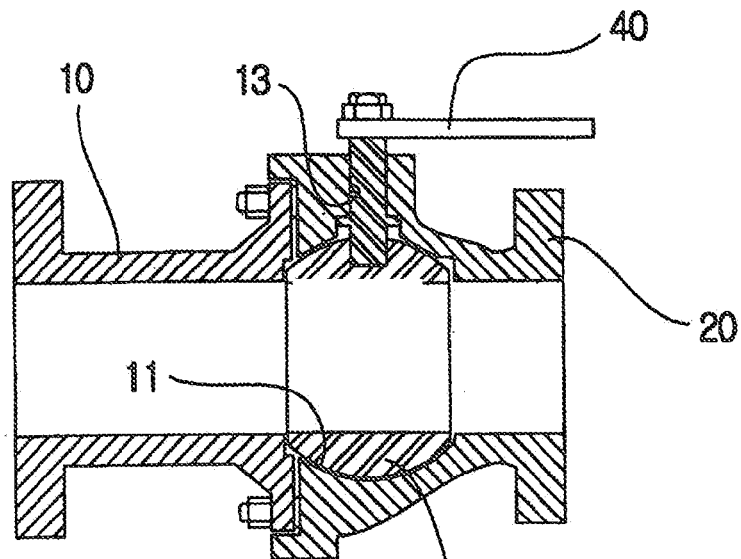
Prior Art
[Fig. 2]
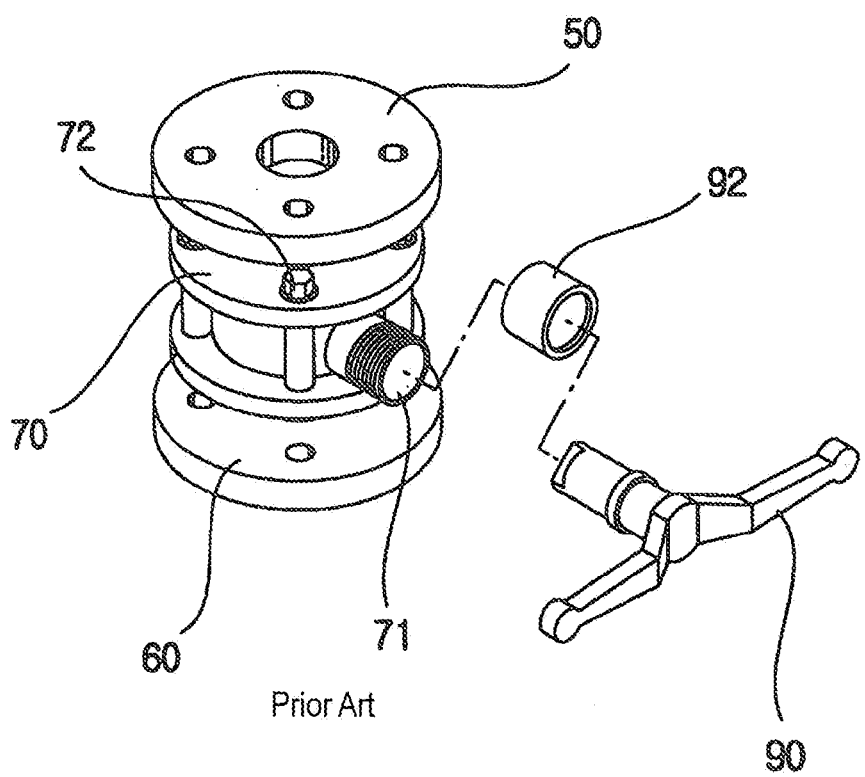
Prior Art

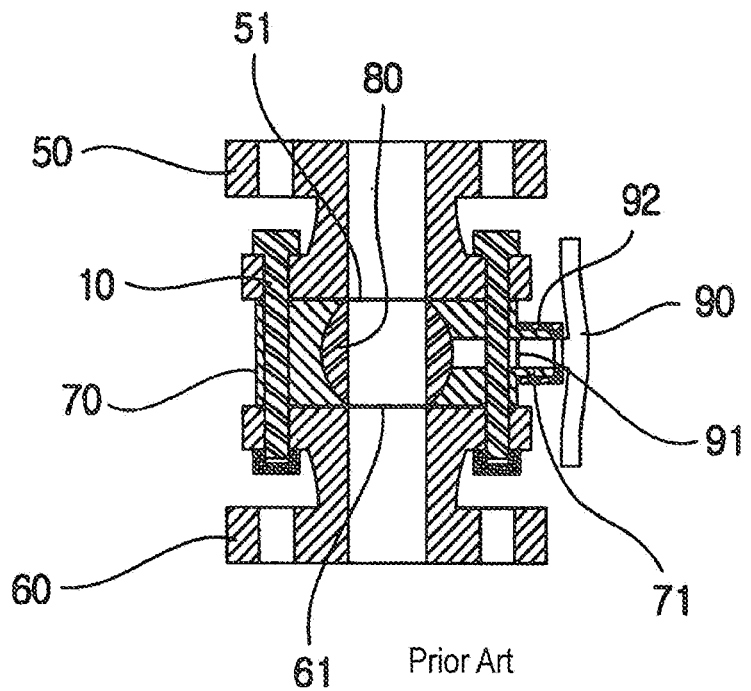
[Fig. 3] Prior Art
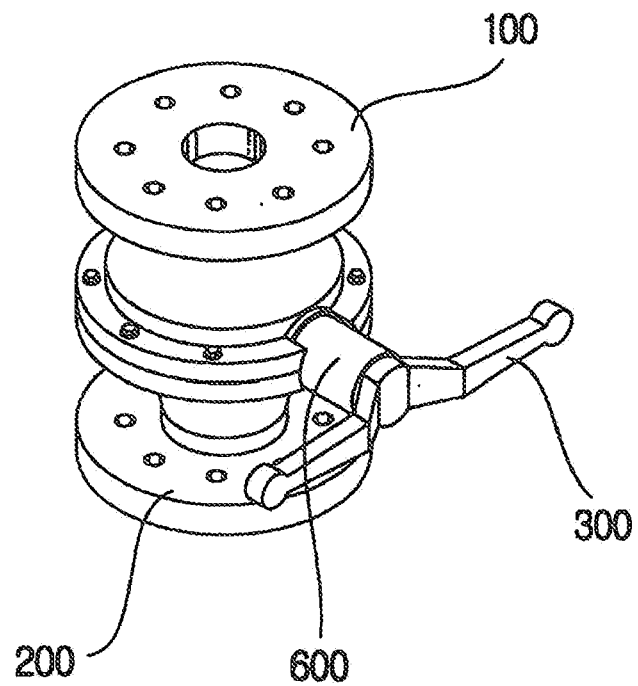
[Fig. 4]

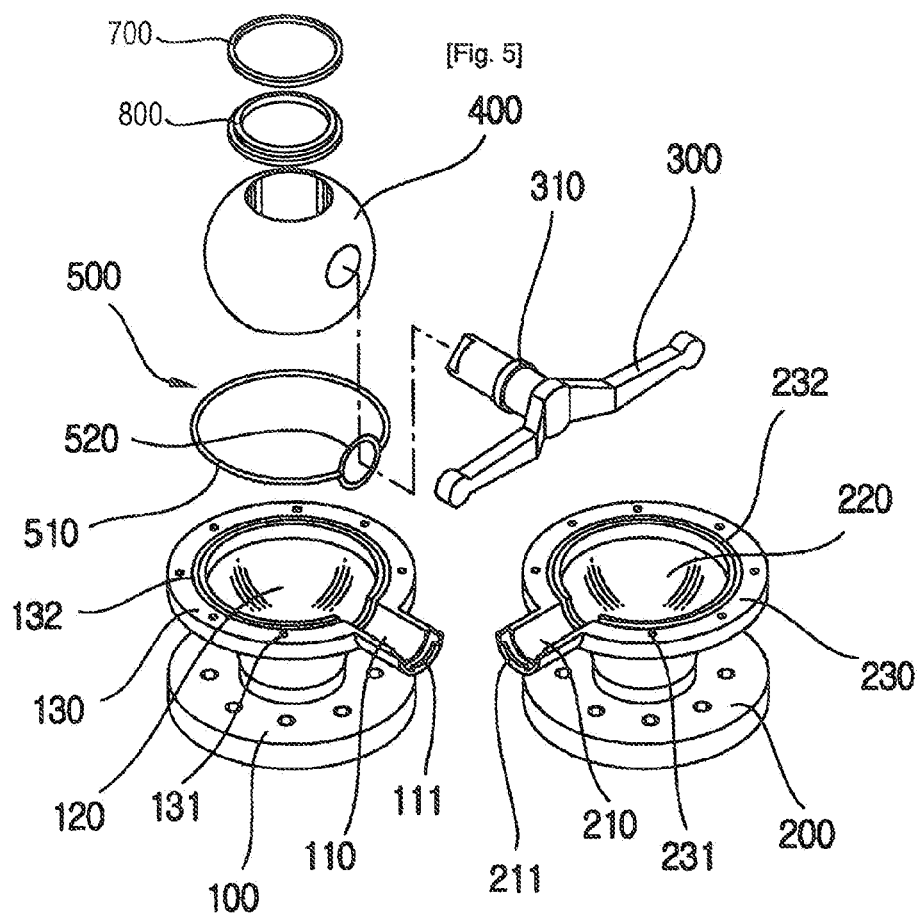
[Fig. 5]
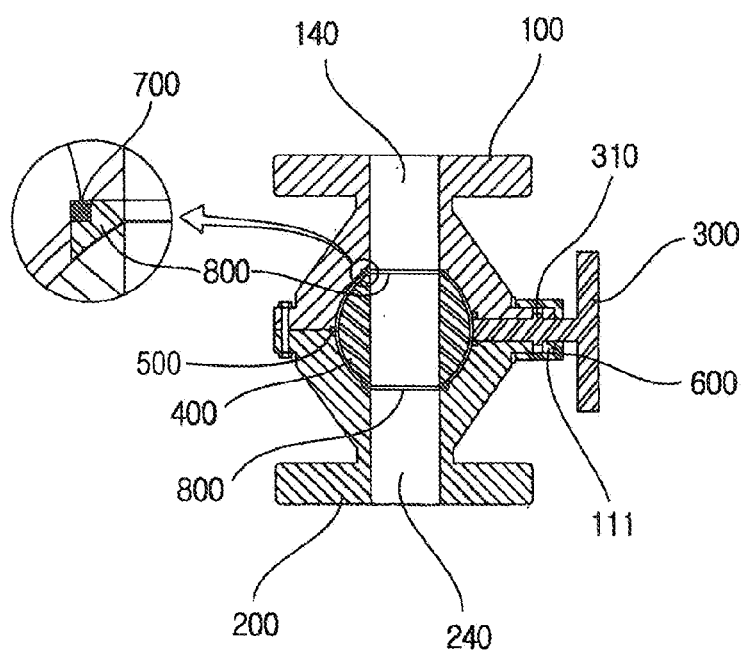
[Fig. 6]

BALL VALVE

TECHNICAL FIELD

The present invention relates, in general, to ball valves to control flows of fluids and, more particularly, to a ball valve which has two symmetric valve casings each having a structure possible to be manufactured through a thermal compression molding process, so that a ball is received in the two valve casings, thus easing an inspection of the ball, and increasing the water tightness of the ball valve.

BACKGROUND ART

Generally, ball valves have short switching times, low torques to drive the ball valves, and watertight structures. Therefore, the conventional ball valves are typically used to control flows of fluids. As shown in FIG. 1, a first conventional ball valve includes asymmetric first and second valve casings 10 and 20. A ball seat 11 is provided in the second valve casing 20. A ball 30 is seated in the ball seat 11.

A lever receiving hole 13 is provided on the second valve casing 20. A control lever 40 is inserted into the lever receiving hole 13 to be integrally coupled to the ball 30. The first conventional ball valve having the above-mentioned structure is interposed between two pipes to couple the two pipes to each other, thus controlling a flow of a fluid passing through the two pipes. When the control lever 40 is positioned in a same direction as the longitudinal directions of the two pipes, the ball valve is opened. When the control lever 40 is positioned in a direction perpendicular to the two pipes, the ball valve is closed.

However, in the first conventional ball valve, as shown in FIG. 1, shapes of the first and second valve casings 10 and 20 to receive therein the ball 30 are asymmetrical. Each of the first and second valve casings 10 and 20 is very complex in its construction. Therefore, it is impossible to manufacture the first conventional ball valve through an injection molding process. Only, the first conventional ball valve must be manufactured through a casting or cutting process. Thus, the first conventional ball valve increases the production costs thereof. Furthermore, a material of the first conventional ball valve is limited.

In the first conventional ball valve, in case that an error of the ball 30 is generated or an inspection of the ball 30 is necessary, a plurality of bolts must be loosened from the first and second valve casings 10 and 20. The first and second valve casings 10 and 20 are thereafter separated from each other. Thereafter, the control lever 40, which has been coupled to the ball 30 through the lever receiving hole 13, is removed from the second valve casing 20 having therein the ball 30. The ball 30 is, thereafter, removed from the second valve casing 20 to be inspected. As such, the first conventional ball valve is problematic in that a lengthy time is required to inspect the ball 30 due to the complicated disassembling process.

In an effort to overcome the problems experienced in the first conventional ball valve with the asymmetric first and second valve casings 10 and 20, a second conventional ball valve, which is made of a synthetic resin through an injection molding process, as shown in FIGS. 2 and 3, was proposed. Referring to FIGS. 2 and 3, the second conventional ball valve includes first and second valve casings 50 and 60 which have symmetric structures and each are manufactured through an injection molding process, and an intermediate casing 70 which is manufactured through an additional injection molding process. The second conventional ball valve further includes a ball 80 which is seated in the intermediate casing 70, and a lever receiving part 71 which is provided on a predetermined portion of the intermediate casing 70. A control lever 90 is inserted into the lever receiving part 71 and is coupled to the ball 80. A first ring 91 is seated in a ring-shaped groove which is provided on a pre-determined portion of the control lever 90.

An external thread is provided on an outer surface of the lever receiving part 71. The second conventional ball valve further includes a cap 92 which has on an inner surface thereof an internal thread. The cap 92 is threadedly fastened to the lever receiving part 71, thus preventing the control lever 90 from being undesirably removed.

The first and second valve casings 50 and 60 are coupled to the intermediate casing 70, with second and third rings 51 and 61 respectively interposed in junctions between the first and second valve casings 50 and 60 and the intermediate casing 70. At this time, the first and second valve casings 50 and 60 are coupled to the intermediate casing 70 by a plurality of longitudinal coupling bolts 72.

However, because the second conventional ball valve includes the three body parts which comprises the first and second valve casings 50 and 60 and the intermediate casing 70, the number of processes and a time required to manufacture the second conventional ball valve are increased. Furthermore, to couple or disassemble the second conventional ball valve having the three body parts, the second conventional ball valve forces a user to spend a lengthy working time and a great manual force. To seal the junctions between the three body parts and the control lever 90, the first, second and third rings 51, 61 and 91 must be respectively provided in the junctions. Even though the first and second rings 51 and 61 are respectively provided in the junctions between the three body parts, the water tightness of the junctions between the three body parts must be reduced while the three body parts are coupled to each other by the plurality of longitudinal coupling bolts 72.

In addition, to maintain a coupled state between the control lever 90 and the ball 80, the cap 92 is threadedly tightened to the lever receiving part 71. The tightening of the cap 92 to the lever receiving part 71 causes a defect in that the cap 92 and even the control lever 90 may be undesirably removed from the intermediate casing 70 due to wear of the thread of the cap 92 or the lever receiving part 71. To remove the ball 80 from the intermediate casing 70 for an inspection of the ball 80, one of the first and second valve casings 50 and 60 is separated from the intermediate casing 70. The cap 92 and the control lever 90 must be further separated from the intermediate casing 70, so that the structure of the second conventional ball valve having the three body parts causes inconvenience to a user.

DISCLOSURE OF INVENTION

Technical Solution

Accordingly, the present invention has been made keeping in mind the above problems occurring in the prior art, and an object of the present invention is to provide a ball valve which has two symmetric valve casings each having a structure possible to be manufactured through an injection molding process, without an additional intermed iate casing, thus being possible to manufacture the ball valve using even an acid resistance material, and increasing the water tightness of the ball valve while simplifying the manufacturing and assembling processes of the ball valve, and easing an inspection of the ball.

In order to accomplish the above object, the present invention provides a ball valve, including a first valve casing made of a thermosetting resin, having: a first ball seat; a first coupling flange provided around the first ball seat; a first lever receiving part provided on a predetermined portion of the first coupling flange; a first ring-shaped groove provided along both the first coupling flange and the first lever receiving part and having a semicircular cross-section; a plurality of first coupling holes provided on the first coupling flange; and a first stopper provided on an end of the first lever receiving part, a second valve casing made of the thermosetting resin and provided to be symmetrical to the first valve casing, having:

a second ball seat; a second coupling flange provided around the second ball seat; a second lever receiving part provided on a predetermined portion of the second coupling flange; a second ring-shaped groove provided along both the second coupling flange and the second lever receiving part and having a semicircular cross-section; a plurality of second coupling holes provided on the second coupling flange; and a second stopper provided on an end of the second lever receiving part, a ball seated in both the first ball seat of the first valve casing and the second ball seat of the second valve casing to control a flow of a fluid, a control lever coupled to the ball to control the ball, with a stop projection provided on a predetermined portion of the control lever to engage with the first and second stoppers of the first and second lever receiving parts, and a ring unit seated in both the first ring-shaped groove of the first valve casing and the second ring-shaped groove of the second valve casing. The ring unit has a first ring part seated in parts of both the first and second ring-shaped grooves provided on the first and second coupling flanges; and a second ring part integrally coupled to the first ring part and seated in parts of both the first and second ring-shaped grooves of the first and second lever receiving parts. The ball valve further includes a cap fastened to both the first and second lever receiving parts.

The ball valve may further include an external thread provided on outer surfaces of the first and second lever receiving parts, and an internal thread provided on an inner surface of the cap.

The ball valve may further include a packing and a packing support unit provided around an inner end of each of first and second through holes of the first and second valve casings.

DESCRIPTION OF DRAWINGS

The above and other objects, features and other advantages of the present invention will be more clearly understood from the following detailed description taken in conjunction with the accompanying drawings, in which:

FIG. 1 is a sectional view of a first conventional ball valve having asymmetric first and second valve casings;

FIG. 2 is a partially exploded perspective view of a second conventional ball valve having symmetric first and second valve casings and an intermediate casing;

FIG. 3 is a sectional view of the second conventional ball valve of FIG. 2;

FIG. 4 is a perspective view of a ball valve, according to an embodiment of the present invention;

FIG. 5 is an exploded perspective view of the ball valve of FIG. 4; and

FIG. 6 is a sectional view of the ball valve of FIG. 4.

BEST MODE

Reference should now be made to the drawings, in which the same reference numerals are used throughout the different drawings to designate the same or similar components.

FIG. 4 is a perspective view of a ball valve, according to an embodiment of the present invention. FIG. 5 is an exploded perspective view of the ball valve of FIG. 4. FIG. 6 is a sectional view of the ball valve of FIG. 4.

Referring to FIGS. 4 through 6, the ball valve of the present invention is made of a molten glass-fiber reinforced plastic (FRP) of a high acid resistance or a molten thermosetting resin (SMC: sheet molding compound) through a thermal compression molding process. The special feature of the present invention resides in that the ball valve comprises symmetric first and second valve casings 100 and 200.

The first and second valve casings 100 and 200 include symmetric first and second lever receiving parts 110 and 210 which are provided on predetermined portions of the first and second valve casings 100 and 200, respectively. A control lever 300 is inserted into both the first and second lever receiving parts 110 and 210. The first and second valve casings 100 and 200 further include symmetric first and second ball seats 120 and 220, respectively, so that a ball 400 is seated in both the first and second ball seats 120 and 220. The first and second valve casings 100 and 200 further include first and second coupling flanges 130 and 230 which are provided around the first and second ball seats 120 and 220, respectively. A plurality of first and second coupling holes 131 and 231 are respectively provided on the first and second coupling flanges 130 and 230, so that the first and second valve casings 100 and 200 are coupled to each other by a plurality of coupling bolts.

First and second stoppers 111 and 211 are respectively provided on ends of the first and second lever receiving parts 110 and 210. A stop projection 310 is provided on a predetermined portion of the control lever 300 to engage with the first and second stoppers 111 and 211, thus preventing the control lever 300 from undesirably removed from the ball valve.

The ball valve of the present invention further comprises a ring unit 500 which is provided in the junction of the first and second valve casings 100 and 200 to obtain the water tightness of the ball valve. First and second ring-shaped grooves 132 and 232 each having a semicircular cross-section are provided along both the first and second coupling flanges 130 and 230 and the first and second lever receiving parts 110 and 210, respectively. The ring unit 500 is seated in the first and second ring-shaped grooves 132 and 232.

The ring unit 500, different from typical rings, comprises a first ring part 510 which is seated in parts of both the first and second ring-shaped grooves 132 and 232, provided on the first and second coupling flanges 130 and 230. The ring unit 500 further comprises a second ring part 520 which is integrally coupled to the first ring part 510 to be perpendicular to the first ring part 510 and is seated in parts of both the first and second ring-shaped grooves 132 and 232, provided on the first and second lever receiving parts 110 and 210.

After the first and second valve casings 100 and 200, the ball 400 and the control lever 300 are assembled into a single body, a cap 600 is fastened to both the first and second lever receiving parts 110 and 210. Preferably, an external thread is provided on an outer surface of each of the first and second lever receiving parts 110 and 210. An internal thread is provided on an inner surface of the cap 600, so that the internal thread of the cap 600 engages with the outer threads of the first and second lever receiving parts 110 and 210.

Furthermore, the ball valve of the present invention further includes a packing support unit 800 which is provided around an inner end of each of first and second through holes 140 and 240 of the first and second valve casings 100 and 200. The ball valve further includes a packing 700 which is provided between the packing support unit 800 and each of the inner ends of the first and second through holes 140 and 240. Due to the packings 700 and the packing support units 800, even when the ball 400 is rotated in the first and second valve casings 100 and 200, desired water tightness is achieved at the junctions between the ball 400 and the first and second valve casings 100 and 200.

The operation and effect of the ball valve of the present invention will be described herein below.

First, both the packings 700 and the packing support units 800 are coupled to the edges of the inner ends of the first and second through holes 140 and 240 of the first and second valve casings 100 and 200. In the above state, the ball 400 is seated in one of the first and second valve casings 100 and 200, for example, in the first valve casing 100. Thereafter, the control lever 300 is coupled to the ball 400 while the stop projection 310 of the control lever 300 engages with the first stopper 111 of the first lever receiving part 110. Therefore, the control lever 300 is stably placed in the first lever receiving part 110 by the first stopper 111 without being allowed to be undesirably removed from the first valve casing 100.

Thereafter, the ring unit 500 is seated in the first ring-shaped groove 132 which is provided along both the first coupling flange 130 and the first lever receiving part 110. The second valve casing 200 is, thereafter, coupled to the first valve casing 100 by the plurality of coupling bolts which are tightened into the plurality of first and second coupling holes 131 and 231. Thereafter, the cap 600 is fastened to both the first and second lever receiving parts 110 and 210, so that the control lever 300 is stably held in the first and second lever receiving parts 110 and 210.

To control the valve, the ball 400 is rotated by the rotation of the control lever 300. At this time, even during the rotation of the ball 400, the ball 400 is in close contact with the packing support units 800. Therefore, the water tightness of the valve is maintained.

In case that an error of the ball 400 is generated or an inspection of the ball 30 is necessary, the cap 600 is loosened from the first and second lever receiving parts 110 and 210. Thereafter, the plurality of coupling bolts is loosened from the first and second coupling holes 131 and 231. One of the first and second valve casings 100 and 200 is, thereafter, separated from a remaining one of the first and second valve casings 100 and 200. Thus, the ball 400 and the control lever 300 are exposed to the outside of the ball valve. Thereafter, the ball 400 and the control lever 300 are simply separated from the remaining one of the first and second valve casings 100 and 200, so that the ball 400 and the control lever 300 can be inspected to be managed, repaired or changed with new ones.

INDUSTRIAL APPLICABILITY

As described above, the present invention provides a ball valve which has a structure possible to be made of a molten glass-fiber reinforced plastic (FRP) of a high acid resistance or a molten thermosetting resin (SMC: sheet molding compound). Therefore, the ball valve of the present invention has the high acid resistance, so that the ball valve can be used in a variety of industrial fields. Particularly, the ball valve of the present invention can be manufactured through a thermal compression molding process, and the stricture of the ball valve is simplified. Accordingly, the production costs of the ball valve are reduced.

Furthermore, the water tightness of the ball valve of the present invention is better than conventional ball valves. When errors are caused in the ball valve, an inspection of the ball valve is easy. Another advantage of the ball valve of the present invention resides in that the assembling and disassembling processes of the ball valve are simplified due to the simple structure of the ball valve, thus reducing working time.

Although the preferred embodiment of the present invention has been disclosed for illustrative purposes, those skilled in the art will appreciate that various modifications, additions and substitutions are possible; without departing from the scope and spirit of the invention as disclosed in the accompanying claims.

The invention claimed is:

1. A ball valve, comprising:
   a first valve casing made of a thermosetting resin, comprising:
      a first ball seat;
      a first coupling flange provided around the first ball seat;
      a first lever receiving part provided on a predetermined portion of the first coupling flange;
      a first ring-shaped groove provided along both the first coupling flange and the first lever receiving part and having a semicircular cross-section;
      a plurality of first coupling holes provided on the first coupling flange; and
      a first stopper provided on an end of the first lever receiving part;
   a second valve casing made of the thermosetting resin and provided to be symmetrical to the first valve casing, comprising:
      a second ball seat;
      a second coupling flange provided around the second ball seat;
      a second lever receiving part provided on a predetermined portion of the second coupling flange;
      a second ring-shaped groove provided along both the second coupling flange and the second lever receiving part and having a semicircular cross-section;
      a plurality of second coupling holes provided on the second coupling flange; and
      a second stopper provided on an end of the second lever receiving part;
   a ball seated in both the first ball seat of the first valve casing and the second ball seat of the second valve casing to control a flow of a fluid;
   a control lever coupled to the ball to control the ball, with a stop projection provided on a predetermined portion of the control lever to engage with the first and second stoppers of the first and second lever receiving parts;
   a ring unit seated in both the first ring-shaped groove of the first valve casing and the second ring-shaped groove of the second valve casing, the ring unit comprising:
      a first ring part seated in parts of both the first and second ring-shaped grooves provided on the first and second coupling flanges; and
      a second ring part integrally coupled to the first ring part and seated in parts of both the first and second ring-shaped grooves provided on the first and second lever receiving parts; and
   a cap fastened to both the first and second lever receiving parts.

2. The ball valve according to claim 1, further comprising:
   an external thread provided on outer surfaces of the first and second lever receiving parts; and
   an internal thread provided on an inner surface of the cap.

3. The ball valve according to claim 1, further comprising:
   a packing and a packing support unit provided around an inner end of each of first and second through holes of the first and second valve casings.

4. The ball valve according to claim 2, further comprising:
   a packing and a packing support unit provided around an inner end of each of first and second through holes of the first and second valve casings.

* * * * *